(12) United States Patent
Lee

(10) Patent No.: US 6,301,234 B1
(45) Date of Patent: Oct. 9, 2001

(54) REDUCTION METHOD OF SUCCESSIVE HARD HANDOFFS BETWEEN BASE STATIONS IN CODE DIVISION MULTIPLE ACCESS (CDMA) MOBILE COMMUNICATION SYSTEM

(75) Inventor: Hyun Goo Lee, Seoul (KR)

(73) Assignee: LG Information & Communications, Ltd., Seoul (KR)

( * ) Notice: Subject to any disclaimer, the term of this patent is extended or adjusted under 35 U.S.C. 154(b) by 0 days.

(21) Appl. No.: 09/078,578

(22) Filed: May 14, 1998

(30) Foreign Application Priority Data

May 22, 1997 (KR) .................................................. 97-19970

(51) Int. Cl.[7] .................................................... H04Q 7/00
(52) U.S. Cl. ......................... 370/331; 370/332; 370/335
(58) Field of Search .................................... 370/328, 331, 370/332, 335, 342, 329, 341; 455/422, 436–444, 450, 451, 452

(56) References Cited

U.S. PATENT DOCUMENTS

| | | | |
|---|---|---|---|
| 5,790,528 | * 8/1998 | Muszynski | 370/331 |
| 5,937,019 | * 8/1999 | Padovani | 375/358 |
| 5,987,013 | * 11/1999 | Kabasawa | 370/331 |
| 6,021,123 | * 2/2000 | Mimura | 370/331 |

* cited by examiner

Primary Examiner—Ajit Patel
(74) Attorney, Agent, or Firm—Fleshner & Kim, LLP

(57) ABSTRACT

A reduction method of successive hard handoffs which prevents the call from dropping and the communication quality from deteriorating which are caused by the successive hard handoffs frequently occurring between base stations according to the system resources in the CDMA mobile communication system is disclosed. The reduction method includes the steps of making a decision on soft or hard handoff possibility according to the strength of the pilot signals of the existing base station holding a current call and the newly added base station by using the pilot strength measurement message received from the mobile station, informing the control station of the resource assignment possibility of the added base station by using the handoff request message transmitted from the control station to the added base station, and performing or completing handoffs according to said resource assignment success or failure. Therefore, since, hard handoffs in this method occurs after the mobile station is completely transferred to the added base station, the frequency of the hard handoff occurrences is reduced.

19 Claims, 4 Drawing Sheets

REDUCTION METHOD OF SUCCESSIVE HARD HANDOFFS BETWEEN BASE STATIONS IN CODE DIVISION MULTIPLE ACCESS (CDMA) MOBILE COMMUNICATION SYSTEM

BACKGROUND OF THE INVENTION

Field of Invention

The present invention relates to a reduction method of successive hard handoffs between base stations in CDMA mobile communication system, more particularly, to a reduction method of successive hard handoffs between base stations in order to prevent dropped calls or quality of communication from being deteriorated because of successive hard handoffs between base stations which frequently occur according to resources of the system.

Generally, there are handoffs of frequent occurrence between adjacent base stations in the CDMA mobile communication system and they are one kind of soft handoffs and hard handoffs according to the resources of the system. Since the successive handoffs have a bad effect upon the quality of communication, the dropped calls and a capacity of the system, it has been a point of issue to reduce the frequency of handoffs.

FIG. 1 is a diagram showing a multiple frequency situation of a general CDMA mobile communication system in which a terminating base station A(104) existing in a boundary region of the multiple frequency environment using the frequency of (Fh group+Fn group) in the dense subscriber region; a control station 1 (102) for controlling an adjacent base station B(105) whose frequency is in Fh group lower than those of the terminating base station A (104) and is in a non-dense subscriber region, a control station 2(103) for controlling the base station C(106); a switching center MSC(100) for exchanging communication data from the control station 1(102) or the control station 2(103); and a location register 101 for registering the location of each mobile station(107, 108) are included.

The handoff control procedure among mobile stations, base stations and control stations in the CDMA mobile communication system is done by the following three messages of a mobile station assisting handoff system.

First, a mobile station observes the pilot strength of a same frequency of the adjacent cell and transmits a pilot strength measurement message PSMM. The base station and the control station analyze the pilot strength measurement message PSMM, determine to construct another path(ADD procedure) or to restore one of previously established paths (DROP procedure) and then direct a handoff by transmitting an extended handoff direction message EHDM to the mobile station.

The mobile station receiving EHDM takes a proper action corresponding to the direction (for example, to indicate, to restore or to establish a new channel) and therefrom transmits a handoff completion message HCM. Under the condition of the PSMM message transmission of a mobile station starting a handoff in the control procedure, the adjacent base station has to have the same frequency bandwidth as the frequency of current call signals.

In the CDMA mobile communication system, the type of handoff is determined by the information concerning with the adjacent base station and the power strength measurement message received from the mobile station.

In the case of a mobile station being transferred to another sector of the same base station, a new channel resource is not allocated and a handoff is done by the channel of an existing call.

However, when a mobile station moves from the base station generating a current call to the direction of another base station, a channel of the new base station is allocated and a channel to the mobile station is established. In the case of soft handoff, a new channel is established under the condition of maintaining the channel having an existing call.

In the case of hard handoff, however, since all channels having the existing calls are recovered and at the same time a new channel is established the possibility of the deterioration of communication quality and the dropped calls will be high.

Therefore, except an inevitable case, the handoff of the code division multiple access (CDMA) method is the type of soft handoff if possible. When the pilot strength of an added base station is larger than that of the base station keeping the existing call and there is no channel corresponding to the corresponding frequency or frame offset in the added base station, the hard handoff is done.

A conventional reduction method of handoff is described in a reduction method of ongoing service handoff in a boundary region CDMA cell disclosed in Korea patent disclosure No. 96-27549(Jul.22, 1996) in which the handoff is done for the call in process in order to reduce the frequency of handoffs. The pilot strength and the distance to the mobile station are evaluated only for a new call. The reduction method is done by classifying the adjacent base stations into three cases of a omni base station, sector base station and combination of omni and sector base stations, and by blocking the call if the adjacent base station is identified as the region between the adjacent cells.

However, it is possible to block the call in order to reduce the frequency of handoffs but the possibility for the call of the mobile stations having a lot of boundary regions to be established is decreased. Therefore, it is proper to reduce the frequency of handoffs after establishing the call.

In a midtown, since the pilot strength between adjacent base stations is rapidly changed because of fading phenomena and the distance to the mobile station is not exactly evaluated, the method is not good enough to reduce the frequency of handoffs. Furthermore, there is a high possibility for the occurrence of hard handoffs between base stations as if playing ping pong.

On the other hand, as a conventional handoff reduction method, a method for achieving a minimum of a possibility that the mobile station in the boundary cell of the CDMA mobile communication station region moves out of the system boundary cell in ongoing service communicating is executed according to each of three cases of which the adjacent cell is an omni cell, a sector cell and a combination of omni and sector cells, and is explained in the followings.

In the case that the adjacent cell is an omni cell, when a call is received whether the received call is new or not is decided. If the call is not new (in the case of handoff), a general call processing procedure is provided. If the call is a new one, it is decided whether or not it is a boundary cell. If it is not a boundary cell, the distance between the mobile station and the cell antenna is evaluated. If the evaluated value is larger than a reference value, the call is blocked. If the evaluated value is not larger than the reference value, a general call processing service is provided.

In the case that the adjacent cell consists of sector cells, when a call is received whether or not the received call is a new one is decided. If the call is not new (in the case of handoff), a general call processing procedure is generally provided. If the call is a new one, it is decided whether or not it is either a boundary sector or to a boundary cell. If it is neither a boundary sector nor a boundary cell, a general call processing service is provided. If it is either a boundary sector or the boundary cell, the call is blocked.

In the case that the adjacent cells are the combination of omni cells and sector cells, when a call is received whether or not the received call is new is decided. If the call is not new (in the case of handoff), a general call processing procedure is provided. If the call is a new one, it is decided whether or not it is either a boundary cell or a boundary sector. If it is neither a boundary cell nor a boundary sector, a general call processing service is provided. If it is either a boundary cell or a boundary sector, the distance between the mobile station and the cell antenna is evaluated. If the evaluated distance is larger than a reference value, the call is blocked. If the evaluated value is not larger than the reference value, a general call processing service is provided. Therefrom, it reduces the possibility that the mobile station in the boundary cell can move out of the system boundary cell during ongoing service.

However, in the conventional handoff reduction method explained above, since the pilot strength received by the mobile station varies by a large amount because the balance of the transmitting power between base stations is not kept or a lot of high buildings stand close together are dense and it is difficult to evaluate the accurate distance to the mobile station, there may be the frequent handoffs among the adjacent base stations when a call is established. Furthermore, if there is no channel resource concerning to the corresponding frequencys or the frame offsets in the base station the hard handoffs may successively exist.

If the hard handoffs occurs in the same way as playing ping-pong between adjacent base stations when the adjacent base stations belong to the switching center different from each other, system load is increased. Furthermore, the temporary dropped call to a subscriber comes into existence because of frequently exchanging a switch according to the frequent hard handoffs between switching centers or the probability of call release according to message loss between switching centers is increased.

SUMMARY OF THE INVENTION

Accordingly, the present invention is directed to solve the problems of the conventional techniques described above. The purpose of the present invention is to provide a reduction method of successive hard handoffs which frequently occurs between base stations according to CDMA mobile communication system resources.

The purpose of the present invention is achieved, in the base stations having the same frequency band, by assigning the resources to each mobile base station so as to perform hard handoffs only when the power strength measurement message received from each mobile base station is greater than or equal to the system parameter level of the base station.

To achieve this and other advantages and in accordance with the purpose of the present invention, as embodied and broadly described, the reduction method of successive hard handoffs between base stations according to the present invention includes the steps of determining the possibility of soft/hard handoffs according to the strength of pilot signal of a newly added base station and a base station in which a current call received from each mobile station is established; deciding the possibility of an resource assignment of the newly added base station by using a handoff request message which the newly added base station receives from the control station and informing the control station of the result of the resource allocation; and performing soft/hard handoffs, requesting a power strength report message or completing a handoff according to the success/failure of resource assignment for each mobile station by using the resource assignment possibility message.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Reference will now be made in detail to the preferred embodiments of the present invention, examples of which are illustrated in the accompanying drawings.

Figure 1:
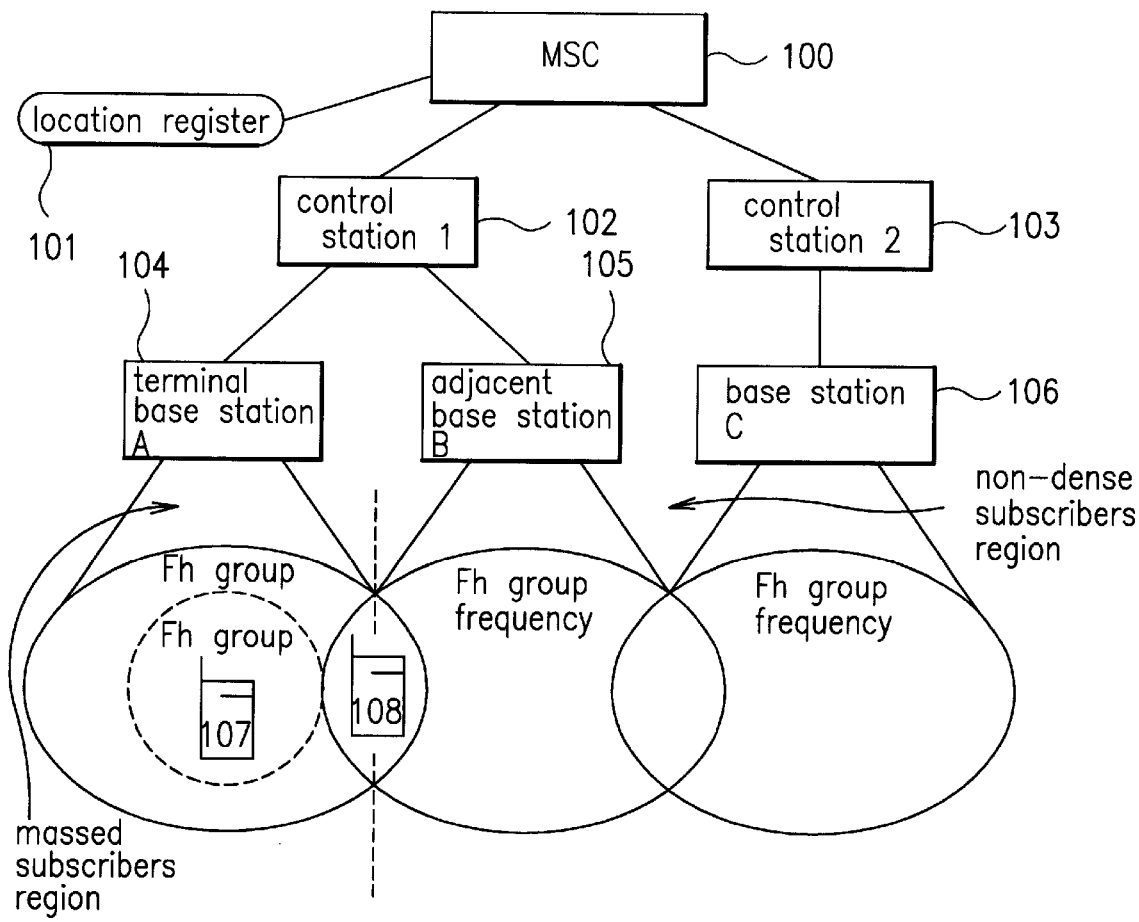
FIG. 1 is a diagram showing a multiple frequency environment of a general code division multiple access (CDMA) system.
Figure 2:
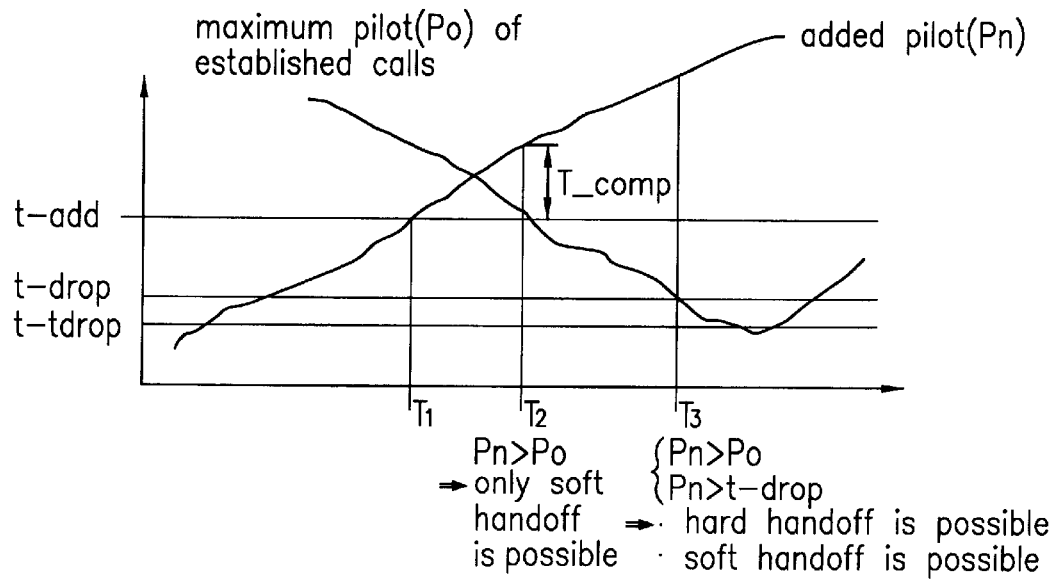
FIG. 2 is a graph showing the possibility of handoffs different from each other according to the pilot signal strength of a newly added base station.
Figure 3:
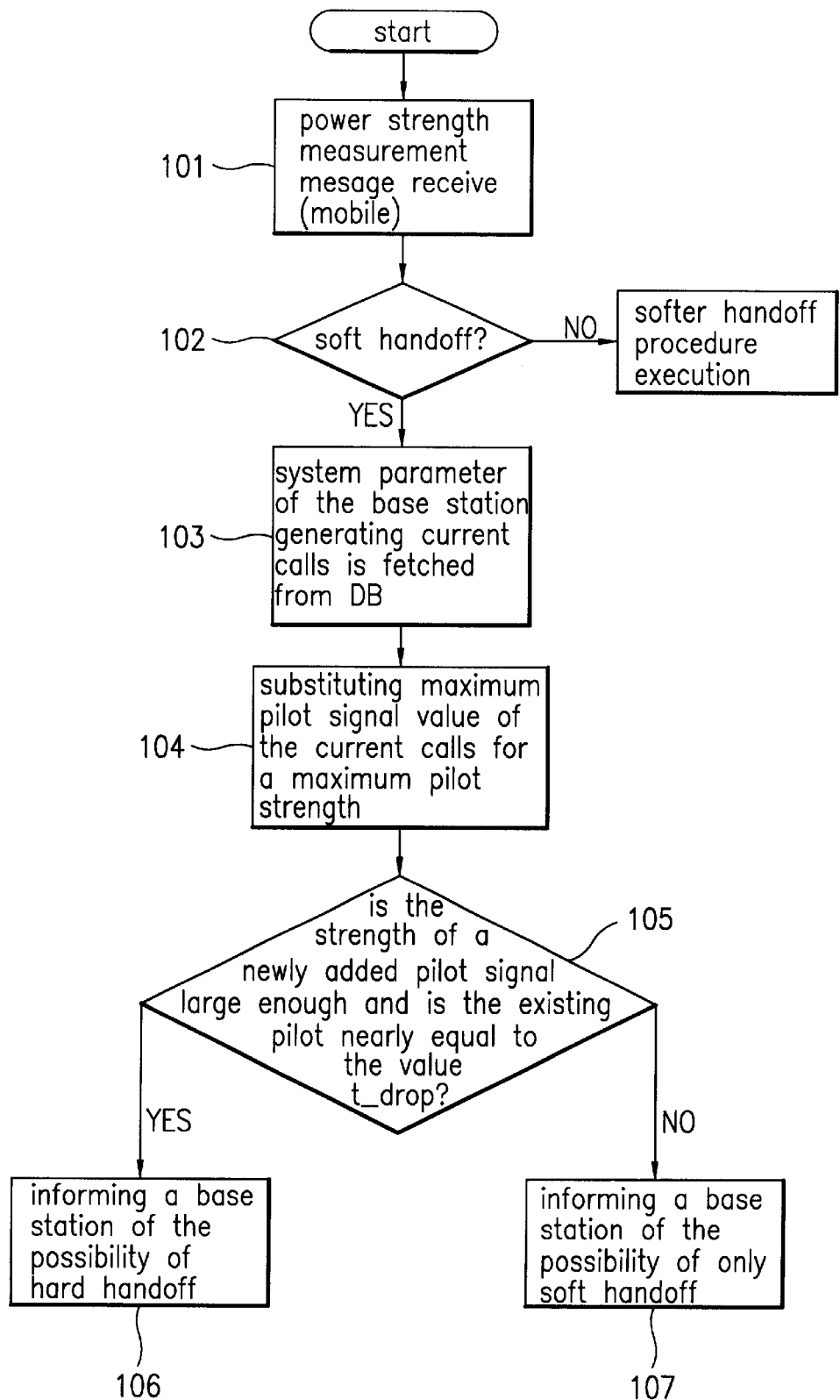
FIG. 3 is a flow chart showing a procedure to make a decision on a possibility of soft/hard handoff according to FIG. 2.

FIG. 2 is a graph showing the possibility of handoffs different from each other according to the pilot signal strength of a newly added base station according to the present invention, and FIG. 3 is a flow chart showing a procedure to make a decision on a possibility of soft/hard handoff according to FIG. 2.

Figure 4:
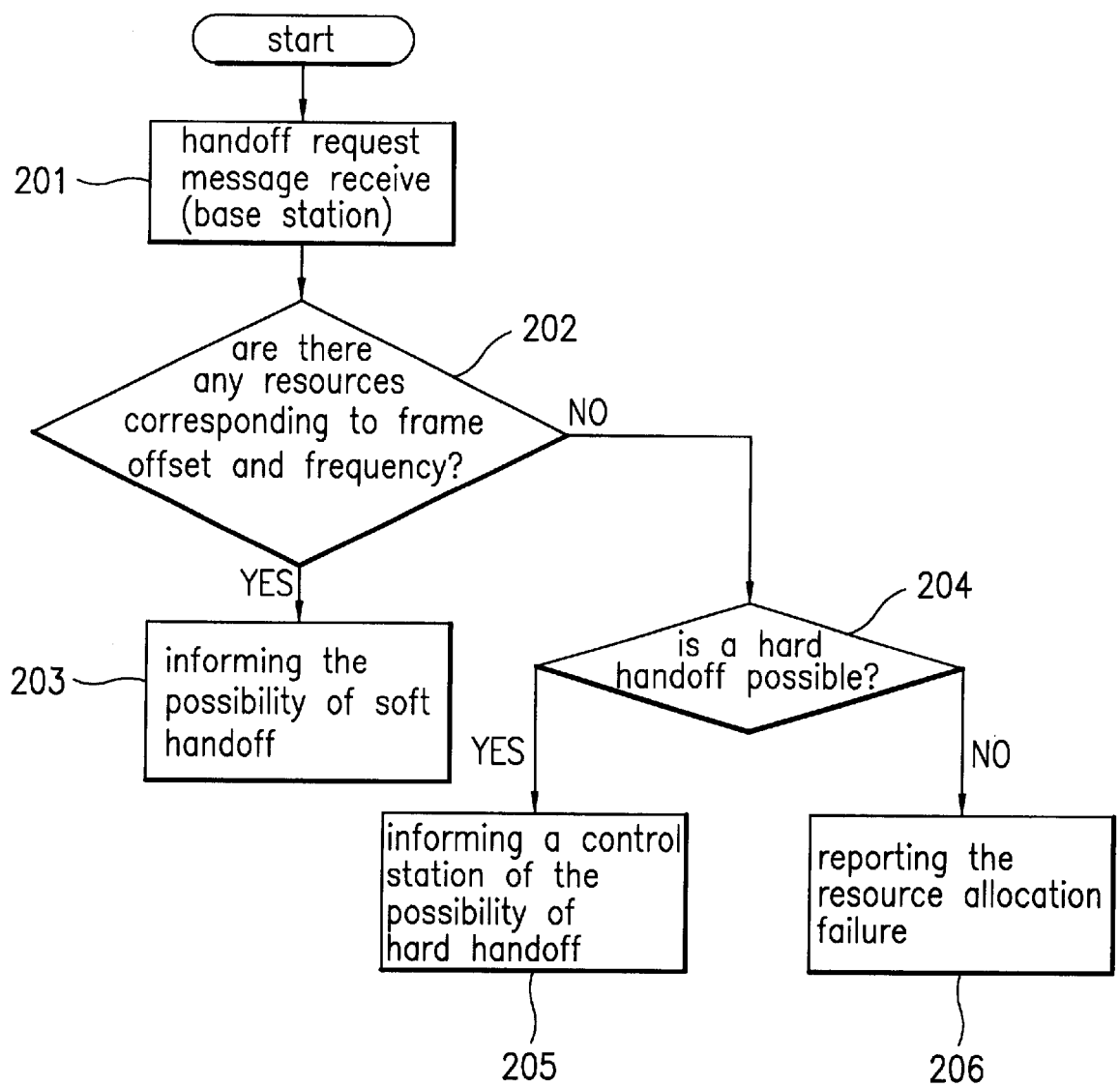
FIG. 4 is a flow chart showing a procedure for an added base station to make a decision on the possibility of resource assignment
Figure 5:
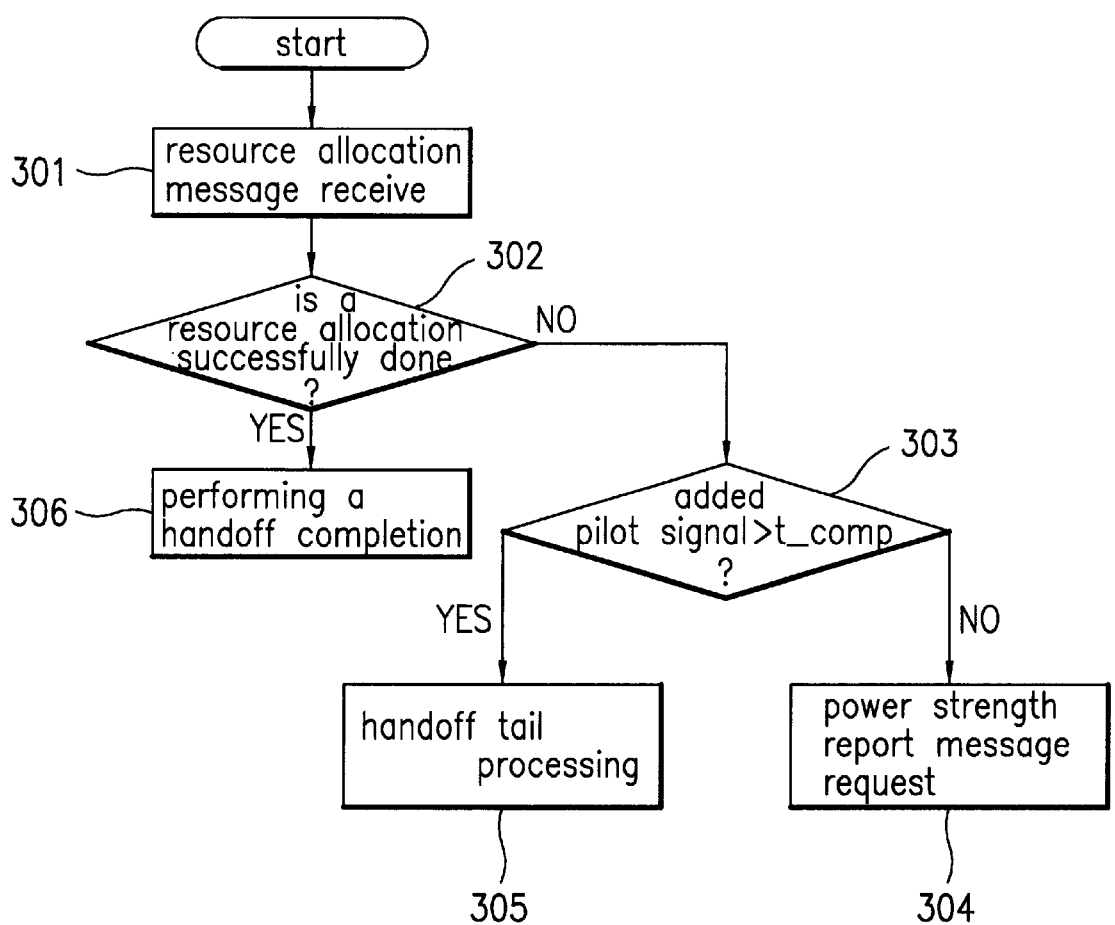
FIG. 5 is a flow chart showing a procedure for making a handoff to an added base station through the resource assignment message, for requesting a power strength report message or for completing the handoff according to the present invention.

FIG. 4 is a flow chart showing a procedure by which the added base station according to the present invention makes a decision on the possibility of resource assignment, and FIG. 5 is a flow chart showing a procedure for making a handoff to an added base station through the resource assignment message, for requesting a power strength report message or for completing the handoff according to the present invention.

The reduction method of successive hard handoff between base stations of the CDMA mobile communication system according to the present invention includes a first step deciding the possibility of soft/hard handoffs according to the strength of pilot signals of a newly added base station and a base station in which a current call is established by using a power strength measurement message received from a mobile station; a second step deciding the possibility of an resource assignment of the newly added base station by using a handoff request message which the newly added base station receives from the control station and informing the control station of the result of the possibility; and a third step either performing soft/hard handoffs or completing a handoff according to the success/failure of the resource assignment.

The present invention is also applicable to the handoffs of a current call in progress as well as a call being newly generated when the failure of the resource assignment of the second step is reported to the control station.

In other words, in the case that a handoff between adjacent base station occurs a system processor for handoff decision decides a handoff type to be performed when the strength of a pilot signal which is included in a pilot signal strength measurement message and will be newly added is larger than a reference value t_add.

In this case, the processor makes a decision on a handoff type (soft, softer, hard) according to the information of the adjacent base station and requests a newly added base station to assign a new channel when a soft or hard handoff among the three handoff types is possible. At this time, by using t_drop and t_comp which are included in the system parameter message, the processor informs the newly added base station whether or not the strength information of the new pilot signal is larger than the pilot signal of the current maximum added pilot by t_comp and a pilot signal with a maximum strength among the pilot signals in existing handoff may be close to drop.

If the base station is requested to assign a channel for handoff, by using the information of the pilot signal strength included in this message, a channel is assigned so as to perform a soft handoff except an inevitable situation. If the handoff is performed in this way, a hard handoff occurs after a mobile station is completely accommodated into a control area of the adjacent base station and a soft handoff occurs when the existing pilot signal is a little less than (or more than) the pilot signal of the newly added base station.

Therefore, when the pilot signal strength of the existing base station is close to t_drop and the pilot signal strength of the newly added base station is higher than the maximum existing action pilot signal by t_comp, a hard handoff may occurs, but the frequency hard handoff occurrence returning to the previous base station is reduced.

Furthermore, by furnishing the information whether or not the currently added pilot signal is larger than the existing pilot signals as much as a hard handoff may occur to the added base station, the base station is made to perform every possible soft handoffs and a hard handoff in the only inevitable case. Therefore, the frequency of instant call transition of a system and a mobile station being caused by hard handoffs is reduced.

Referring to FIG. 2, when a user turns on a terminal the system parameters(t_drop, t_comp, etc.) concerned with handoffs are received from the base station through a paging channel of the base station and stored in the memory of the terminal. Under the condition that a call is established between the terminal and at least one mobile station for communication, if the terminal moves close to other base station the pilot strength newly received from other base station gets larger. Thus, if the newly added pilot strength is larger than the system parameter(t_add) stored in the terminal(T1) the terminal transmits PN(pilot number) information and power strength information concerned with other base station as a PSMM(pilot strength measurement message) to the control station through the base station having an ongoing call.

On the other hand, the decision procedure that a mobile station makes a decision on the soft/hard handoffs according to the pilot signal strength of the newly added base station is explained by referring to FIG. 3.

When a power strength measurement message is received from a mobile station (101), the system processor for the handoff decision of the control station makes a decision on the handoff type according to a new pilot information included in the message and an information concerned with the adjacent base stations within its control area.

In the case that the handoff type is soft (102), system parameters t_drop and t_comp are fetched from DB (103) so as to compare the strength of the new pilot signal with the pilot signal strength of the base station holding a current call.

Here, t_drop is the last parameter necessary for the system having an ongoing call to hold the call. A hard handoff may occur even when the mobile station is not completely transferred to the newly added base station but is on the cell boundary. Hence, when the midtown base stations are not balanced the hard handoffs may occur between the base stations like playing ping-pong.

Therefore, the newly added pilot is compared with the pilot with maximum strength among the pilot signals performing a handoff with the existing call. If the strength of the new pilot is larger than t_comp and the maximum strength of the existing pilot signals is smaller than t-drop, the information that a hard handoff is possible is transmitted to the base station to which the newly added pilot belongs (104–106), and if not, the newly added base station is requested to assign a channel so that a soft handoff is performed (104–107).

The procedure for assigning resources to the added base station according to the present invention is explained by referring to FIG. 4.

The newly added base station is requested a handoff, receives messages from the system processor for the handoff decision (201), assigns a new channel by deciding whether or not the information described above is included in the received message and whether or not the corresponding frame offset and the corresponding frequency channel are available (202). The base station performs the total handoffs in a soft type, if possible (203). However, when there are no channels or no frame offsets in the corresponding frequency it makes a decision on whether a hard handoff is possible (204). If the hard handoff is possible, the control station is informed of the possibility of the hard handoff (205), and if not, the control station is informed of the resource assignment failure (206).

The procedure for the control station to perform or complete the handoffs according to the resource assignment message received from the base station is explained by referring to the FIG. 5. The system processor for the handoff decision performs the handoffs according to the pilot strength measurement message received from the mobile station. Only when the processor is informed of channel resource assignment failure message (301, 302) and the strength of the pilot to be newly added to the recently received pilot strength is larger than the maximum strength of the existing pilot signals by t_comp (303), the mobile station is requested for the power strength measurement report message (304).

The reason is that according to the existing International Standard J-STD-800, since the mobile station transmits the pilot strength measurement message to the system when the newly added pilot is larger than the existing pilot by t_comp and does not re-transmit the pilot strength measurement message to the system when there is no response for this message, a handoff does not occur in the mobile assisted handoff (MAHO) procedure (305). According to the same way as described above, the control station performs a soft handoff when the resource assignment in the added base station is successful (306).

Therefore, since the reduction method of successive hard handoffs between base stations according to the present invention makes use of all the system parameters t_comp and t_drop, the pilot strength measurement message according to JSTD-800 could not be transmitted to the system(This is the case that the newly added pilot is larger than the existing pilot by t_comp). Hence, in the case that the channel from the base station is failed, the pilot strength measurement message received in the latest is analyzed. The mobile station is requested for the pilot strength request order message only when the newly added pilot signal is larger than the existing pilot signal by t_comp and the mobile station performs the handoffs to a new base station.

As described in detail above, the reduction method of successive hard handoffs between base stations in the CDMA mamobile communication system according to the present invention prevents a call from dropping and improves the communication quality since a hard handoff is performed after each mobile station is completely transferred to a control area of a newly added base station and therefrom the frequency of successive hard handoffs is reduced.

According to the reduction method of successive hard handoffs between base stations in the CDMA mobile communication system of the present invention, since the resources is assigned according to the possibility of hard handoffs determined by the comparison between the pilot signal being newly added when a new channel is requested in the adjacent base station and the existing pilot signal, the pin-pong phenomena of hard handoffs which can occur under the condition that the resources of base station is almost occupied because of call congestion in midtown area is prevented from occurring.

It will be apparent to those skilled in the art that various modifications and variations can be made in the reduction method of successive hard handoffs between base stations in the CDMA mobile communication system of the present invention without departing from the spirit or scope of the invention. Thus, it is intended that the present invention covers the modifications and variations of this invention provided they come within the scope of the appended claims and their equivalents.

What is claimed is:

1. A method of reducing successive hard handoffs between base stations in a CDMA mobile communication system, comprising:
   a) determining whether a pilot signal strength of a newly added base station exceeds a first prescribed threshold, and whether a pilot signal strength of a base station to which a mobile terminal has an established call is below a second prescribed threshold;
   b) determining at least one of a resource assignment and a resource allocation of the added base station by using a handoff request message, which the added base station receives from a control station; and
   c) performing one of a soft handoff and a hard handoff according to the pilot signal determinations and a resources assignment message indicating a success or failure of the resource assignment.

2. The method of reducing successive hard handoffs between base stations in the CDMA mobile communication system claimed in claim 1, wherein step a) comprises:

receiving a pilot strength measurement message from each mobile station;
   determining a handoff type according to new pilot information included in the pilot strength measurement message and information of adjacent base stations;
   receiving system parameters t_drop and t_comp from DB after making a comparison between the new pilot signal strength and the pilot signal strength of the base station holding the established call when the handoff type is soft;
   making a comparison between the newly added pilot and the pilot with maximum strength among the pilot signals which are performing the existing handoff call; and
   transmitting information of a hard handoff possibility to the base station to which the newly added pilot belongs when the newly added pilot signal is larger than the system parameter t_comp and the pilot signal with maximum strength among the existing pilot signals is close to the pilot signal which uses the system parameter t_drop.

3. The method of reducing successive hard handoffs between base stations in the CDMA mobile communication system claimed in claim 2, wherein said system parameters t_drop and t_comp are used as a message for making a decision on the handoff level of each mobile station.

4. The method of reducing successive hard handoffs between base stations in the CDMA mobile communication system claimed in claim 2, wherein the step of transmitting further includes requesting a channel assignment to perform soft handoffs when the newly added pilot signal is larger than the system parameter t_comp and the pilot signal with maximum strength among the existing pilot signals is close to t_drop.

5. The method of reducing successive hard handoffs between base stations in the CDMA mobile communication system claimed in claim 1, wherein step b) comprises:
   transmitting a handoff message from a system processor to the added base station;
   determining whether or not there are resources for corresponding frame offsets and corresponding frequency channels in the handoff request message;
   performing a soft handoff if there are the corresponding resources and determining a hard handoff possibility if there is neither channel nor frame offset available in the corresponding frequency; and
   making a decision on a channel assignment according to the hard handoff possibility.

6. The method of reducing successive hard handoffs between base stations in the CDMA mobile communication system claimed in claim 5, further comprising informing the control station of the hard handoff possibility when the hard handoff is possible.

7. The method of reducing successive hard handoffs between base stations in the CDMA mobile communication system claimed in claim 1, wherein step c) comprises:
   receiving information of the resource assignment success or failure from the added base station;
   performing a soft handoff when the resource assignment is possible;
   comparing the pilot signal in a received pilot strength measurement message to the pilot signal with maximum strength among the existing pilot signals when a channel resource assignment failure message is received; and requesting the pilot measurement request order message to the mobile station only when the result of said comparison is at least t_comp.

8. The method of reducing successive hard handoffs between base stations in the CDMA mobile communication system claimed in claim 7, further comprising completing the handoffs between base stations when a candidate pilot signal strength is less than the strongest active pilot strength plus t_comp.

9. The method of reducing successive hard handoffs between base stations in the CDMA mobile communication system claimed in claim 6, wherein the hard handoff is possible when the pilot signal strength of the added base station exceeds system parameter t_comp and the pilot signal strength of the base station to which a mobile terminal has an established call falls below system parameter t_drop.

10. The method of reducing successive hard handoffs between base stations in the CDMA mobile communication system claimed in claim 1, wherein a hard handoff is possible only when (a) the pilot signal strength of the added base station exceeds the pilot signal strength of the base station with the established call by a prescribed amount and (b) the pilot signal strength of the base station with the established call is less than a drop threshold.

11. The method of reducing successive hard handoffs between base stations in the CDMA mobile communication system claimed in claim 10, wherein the prescribed amount is system parameter t_comp.

12. The method of reducing successive hard handoffs between base stations in the CDMA mobile communication system claimed in claim 1, wherein the first prescribed threshold is an add threshold and the second prescribed threshold is a drop threshold.

13. A method of performing a hard handoff, comprising:

comparing a pilot signal strength of an available base station to a pilot signal strength of an active base station holding an existing call at a first frequency;

determining whether the available base station has available channels or frame offsets at the first frequency;

performing a hard handoff to the available base station if no channels or frame offsets are available at the first frequency and if the pilot strength of the available base station exceeds a first prescribed threshold and the pilot strength of the active base station is below a second prescribed threshold.

14. The method of claim 13, wherein the second prescribed threshold is the lowest strength at which a communication system can maintain a call.

15. The method of claim 13, wherein the first prescribed threshold is a maximum strength of all pilot signals capable of performing a handoff with the existing call.

16. The method of claim 13, further comprising performing a soft handoff to the available base station if an available channel or frame offset exists at the first frequency.

17. The method of claim 13, wherein the first prescribed threshold is system parameter t_comp, and wherein the second prescribed value is system parameter t_drop.

18. The method of claim 13, wherein the first prescribed threshold is the pilot signal strength of the active base station increased by a prescribed value, and wherein the second prescribed threshold is a drop threshold, which has a power value below which a call cannot be maintained.

19. The method of claim 13, further comprising completing the handoffs between base stations when a candidate pilot signal strength is less than the strongest active pilot strength plus t_comp.

* * * * *